(12) United States Patent
Petrov et al.

(10) Patent No.: US 11,927,264 B2
(45) Date of Patent: Mar. 12, 2024

(54) MAGNETIC ACTUATOR AND A GEAR SYSTEM COMPRISING THE SAME

(71) Applicant: LAPPEENRANNAN-LAHDEN TEKNILLINEN YLIOPISTO LUT, Lappeenranta (FI)

(72) Inventors: Ilya Petrov, Lappeenranta (FI); Juha Pyrhönen, Lappeenranta (FI)

(73) Assignee: LAPPEENRANNAN-LAHDEN TEKNILLINEN YLIOPISTO LUT, Lappeenranta (FI)

(*) Notice: Subject to any disclaimer, the term of this patent is extended or adjusted under 35 U.S.C. 154(b) by 207 days.

(21) Appl. No.: 17/427,538

(22) PCT Filed: Jan. 7, 2020

(86) PCT No.: PCT/FI2020/050011
§ 371 (c)(1),
(2) Date: Jul. 30, 2021

(87) PCT Pub. No.: WO2020/157373
PCT Pub. Date: Aug. 6, 2020

(65) Prior Publication Data
US 2022/0099181 A1    Mar. 31, 2022

(30) Foreign Application Priority Data
Feb. 1, 2019    (FI) ..................... 20195066

(51) Int. Cl.
*F16H 63/00*    (2006.01)
*F16D 27/00*    (2006.01)
(Continued)

(52) U.S. Cl.
CPC ......... *F16H 63/304* (2013.01); *F16D 27/004* (2013.01); *F16D 27/108* (2013.01);
(Continued)

(58) Field of Classification Search
CPC .................. F16H 63/304; F16H 3/089; F16H 2063/3046; F16H 2063/305;
(Continued)

(56) References Cited

U.S. PATENT DOCUMENTS 4,785,210 A * 11/1988 Maruyama ............. H04N 23/67
                                                         318/135
5,827,148 A    10/1998 Seto et al.
(Continued)

FOREIGN PATENT DOCUMENTS

CH    624 522 A5    7/1981
CN    1747079 A     3/2006
(Continued)

OTHER PUBLICATIONS

International Search Report for PCT/FI2020/050011, dated May 7, 2020, 3 pages.
(Continued)

*Primary Examiner* — Victor L Macarthur
(74) *Attorney, Agent, or Firm* — NIXON & VANDERHYE

(57) ABSTRACT

A magnetic actuator includes a first element and a second element movable with respect to the first element in a movement direction. The first element includes teeth successively in the movement direction, two coils in slots defined by the teeth, and a permanent magnet. The second element includes teeth successively in the movement direction. The teeth of the first and second elements and the permanent magnet are arranged so that the second element is held by magnetic forces in each of three positions also when there are no currents in the coils. The second element can be moved between the three positions by supplying electric currents to the coils. Thus, the second element is (Continued)

held in any of the three positions also when current supply to the magnetic actuator is unintentionally lost.

13 Claims, 3 Drawing Sheets

(51) Int. Cl.
    *F16D 27/108*     (2006.01)
    *F16H 63/30*     (2006.01)
    *H01F 7/08*     (2006.01)
    *H01F 7/16*     (2006.01)
    *F16D 23/02*     (2006.01)
    *F16H 3/089*     (2006.01)

(52) U.S. Cl.
    CPC .............. *H01F 7/081* (2013.01); *H01F 7/16* (2013.01); *F16D 23/02* (2013.01); *F16D 2027/008* (2013.01); *F16H 3/089* (2013.01); *F16H 2063/3046* (2013.01); *F16H 2063/305* (2013.01); *F16H 2200/0034* (2013.01)

(58) Field of Classification Search
    CPC ..... F16H 2200/0034; F16H 2063/3093; F16D 27/004; F16D 27/108; F16D 23/02; F16D 2027/008; F16D 27/118; F16D 11/14; F16D 11/10; F16D 2500/10462; F16D 2500/10475; F16D 48/064; F16D 27/10; H01F 7/081; H01F 7/16; H01F 7/1615; H02K 33/12; H02K 41/033
    See application file for complete search history.

(56) References Cited

U.S. PATENT DOCUMENTS

| | | | |
|---|---|---|---|
| 8,264,104 B2* | 9/2012 | Schrader | G02B 7/08 310/12.24 |
| 10,533,618 B2* | 1/2020 | Kimes | F16D 23/02 |
| 2009/0127059 A1 | 5/2009 | Knoblauch | |
| 2010/0200351 A1 | 8/2010 | Boese et al. | |
| 2011/0248806 A1* | 10/2011 | Michael | H01F 7/04 335/295 |
| 2016/0265940 A1* | 9/2016 | Burgdorf | H01F 13/00 |
| 2018/0038425 A1 | 2/2018 | Kimes | |
| 2018/0195604 A1 | 7/2018 | Appeltauer | |

FOREIGN PATENT DOCUMENTS

| | | |
|---|---|---|
| CN | 101657649 A | 2/2010 |
| CN | 103189939 A | 7/2013 |
| CN | 105655086 A | 6/2016 |
| CN | 105822743 A | 8/2016 |
| CN | 106683824 A | 5/2017 |
| CN | 206180818 U | 5/2017 |
| CN | 108916345 A | 11/2018 |
| DE | 10 2015 011 250 B3 | 11/2016 |
| EP | 3 139 054 | 3/2017 |
| FR | 2 583 489 | 12/1986 |
| JP | H05-055029 A | 3/1993 |
| JP | H07-037461 A | 2/1995 |
| JP | WO2013/157316 A1 | 12/2015 |
| JP | 2018-096382 A | 6/2018 |
| KR | 10-1233061 B1 | 2/2013 |
| KR | 10-2017-0096249 A | 8/2017 |
| WO | 2007/085348 | 8/2007 |
| WO | 2008/131937 A1 | 11/2008 |
| WO | 2013/157316 A1 | 10/2013 |
| WO | 2015/048082 | 4/2015 |
| WO | 2016/207492 A1 | 12/2016 |

OTHER PUBLICATIONS

Written Opinion of the ISA for PCT/FI2020/050011, dated May 7, 2020, 6 pages.
Search Report for PCT/FI20195066, dated Oct. 1, 2019, 1 page.
Office Action issued in Chinese Patent Application No. 202080009898.2 dated Feb. 7, 2023.
Wentao Fan et al., "Research and Simulation of Magnetic Field of Cylindrical Giant Magnetostrictive Actuator," Functional Materials, Dec. 31, 2017, pp. 05054-05060.
Dan Xia et al., "Application of ANSYS in Electromagnetic Actuator," Journal of Gansu Sciences, Mar. 31, 2013, vol. 25, No. 1, pp. 116-119.

* cited by examiner

MAGNETIC ACTUATOR AND A GEAR SYSTEM COMPRISING THE SAME

This application is the U.S. national phase of International Application No. PCT/FI2020/050011 filed 7 Jan. 2020, which designated the U.S. and claims priority to FI Patent Application No. 20195066 filed 1 Feb. 2019, the entire contents of each of which are hereby incorporated by reference.

BACKGROUND OF THE INVENTION

Field of the Invention

The disclosure relates to a magnetic actuator that can be, for example but not necessarily, a part of a gear system capable of producing different gear ratios. Furthermore, the disclosure relates to a gear system comprising at least one magnetic actuator for controlling the gear system to produce a desired one of selectable gear ratios.

DESCRIPTION OF THE RELATED ART

In many devices and systems there is a need for an actuator for changing and controlling a position of a functional element. Without limiting generality and merely for exemplifying purposes, we consider a gear system that comprises a first shaft provided with first gear wheels and a second shaft provided with second gear wheels. Each of the second gear wheels is capable of transferring torque to and from the second shaft and meshes with a corresponding one of the first gear wheels. In this exemplifying case, the gear ratio between the above-mentioned first and second shafts can be selected by locking a desired one of the first gear wheels in a torque transferring way to the first shaft and by allowing the other one or ones of the first gear wheels to rotate freely with respect to the first shaft. The gear system can be set to a neutral position by allowing all the first gear wheels to rotate freely with respect to the first shaft. Therefore, there is a need for a coupling arrangement with the aid of which a desired one of the first gear wheels can be locked to the first shaft in a torque transferring way.

A traditional coupling arrangement comprises typically one or more collar elements each being capable of transferring torque to and from a shaft and capable of sliding along the shaft between two gear wheels provided on the shaft. Each collar element comprises indentations, e.g. dog clutch teeth, capable of locking to corresponding indentations of the gear wheels in a torque transferring way. Furthermore, the coupling arrangement may comprise synchronizing means, such as e.g. a cone clutch, for synchronizing rotation speeds of a gear wheel and a collar element prior to forming a torque transferring coupling between the collar element and the gear wheel under consideration. Typically, the coupling arrangement further comprises one or more gear-shift forks for moving the one or more collar elements in the axial direction. The outer surface of each collar element has typically a circumferential groove for the corresponding gear-shift fork. Each gear-shift fork can be operated with mechanical, hydraulic, pneumatic, and/or electrical means.

A coupling arrangement of the kind described above is, however, not free from challenges. One of the challenges is related to a need to arrange the one or more gear-shift forks so that force directed by a gear-shift fork to a collar element is so axially directed and so symmetric with respect to the shaft that the gear-shift fork does not tend to twist the collar element. Furthermore, in some cases, the friction between the collar element and the gear-shift fork may be problematic as there can be a significant speed difference between contacting surfaces of the collar element and the gear-shift fork and thereby even a moderate friction force may correspond to a significant instantaneous heating power.

Publication U.S. Pat. No. 5,827,148 describes a magnetic actuator for operating a gear system. The magnetic actuator comprises a collar element capable of transferring torque to and from a shaft surrounded by the collar element. The collar element is capable of sliding in the axial direction with respect to the shaft. The collar element comprises indentations for coupling in a torque transferring way with corresponding indentations of gear wheels of the gear system. The collar element comprises permanent magnet material that may be subject to mechanical impacts especially when the indentations of the collar element are forming a torque transferring coupling with the corresponding indentations of a rotating gear wheel. Permanent magnet materials are typically brittle and thus their resistance to mechanical stress is limited. Furthermore, the collar element should be held in its position when current supply to coils of the magnetic actuator is unintentionally lost. Especially, the collar element needs to be reliably held in a middle position corresponding to a neutral position of the gear system also when there is no current supply to the magnetic actuator because an unintentional shift away from the neutral position can be even dangerous.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new magnetic actuator that can be, for example but not necessarily, a part of a gear system capable of producing different selectable gear ratios.

A magnetic actuator according to the invention comprises a first element and a second element that is movable with respect to the first element in a movement direction. The first element comprises:
- a first core section comprising first and second teeth successively in the movement direction and protruding towards the second element and a first yoke connected to the first and second teeth,
- a first coil having a coil side between the first and second teeth and suitable for carrying electric current perpendicularly to the movement direction,
- a second core section comprising third and fourth teeth successively in the movement direction and protruding towards the second element and a second yoke connected to the third and fourth teeth, a second coil having a coil side between the third and fourth teeth and suitable for carrying electric current perpendicularly to the movement direction, and a permanent magnet between the first and second core sections so that the first and second core sections are successively in the movement direction and the permanent magnet is adjacent to the second and third teeth, the permanent magnet having a direction of magnetization non-intersecting with the movement direction.

The second element comprises fifth and sixth teeth successively in the movement direction and protruding towards the first element and a yoke connected to the fifth and sixth teeth. Each of the first core section, the second core section, and the second element comprises material having relative magnetic permeability greater than one, $\mu_r > 1$.

The fifth and sixth teeth of the second element are aligned with the first and third teeth of the first element respectively when the second element is in a first position with respect to the first element, the fifth and sixth teeth are aligned with the second and third teeth respectively when the second element is in a second position with respect to the first element, and the fifth and sixth teeth are aligned with the second and fourth teeth respectively when the second element is in a third position with respect to the first element.

As the above-mentioned teeth of the first and second elements and the permanent magnet are arranged in the above-described way, the second element is held by magnetic forces in each of the above-mentioned three positions in a stable way also when there are no currents in the first and second coils. The second element can be moved between the three positions by supplying electric currents to the first and/or second coils. Furthermore, the second element of the above-described magnetic actuator can be free from permanent magnet material.

The impedance of the first and second coils are dependent on the position of the second element with respect to the first element. Thus, the position of the second element can be determined based on electric responses of the first and second coils when being supplied with an electric measurement signal.

In accordance with the invention, there is provided also a new gear system that comprises:

a gear-wheel assembly capable of producing gear ratios that are different from each other, and at least one magnetic actuator according to the invention for controlling the gear-wheel assembly to produce a selected one of the gear ratios.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments and their advantages are explained in greater detail below in the sense of examples and with reference to the accompanying drawings, in which.

DESCRIPTION OF THE PREFERRED EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
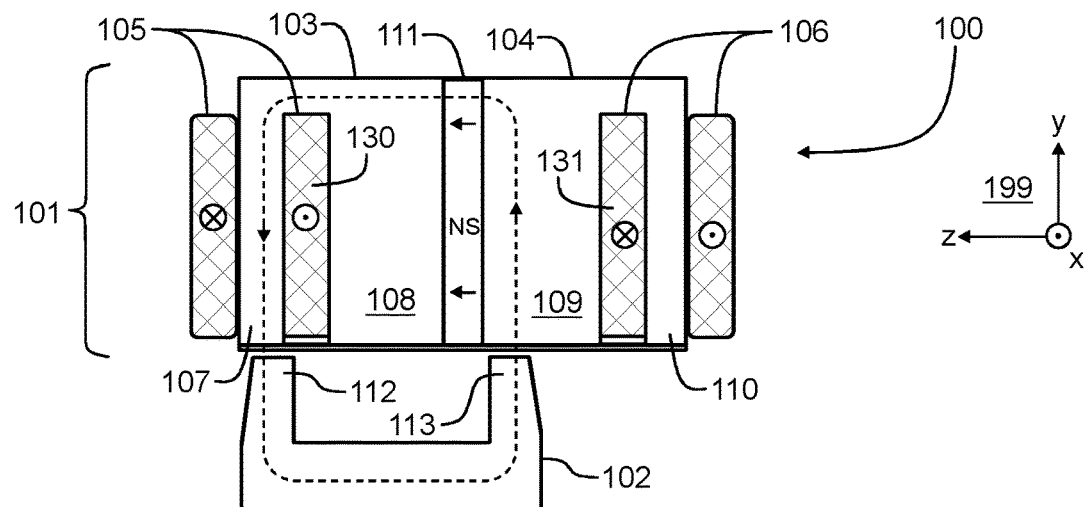
FIGS. 1a, 1b, and 1c illustrate a magnetic actuator according to an exemplifying and non-limiting embodiment.
Figure 1B:
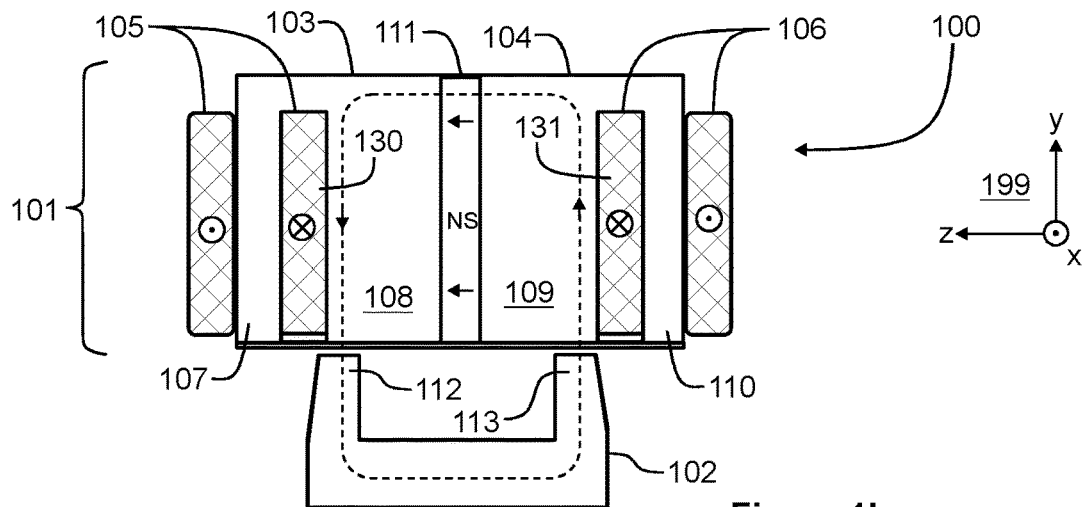
Figure 1C:
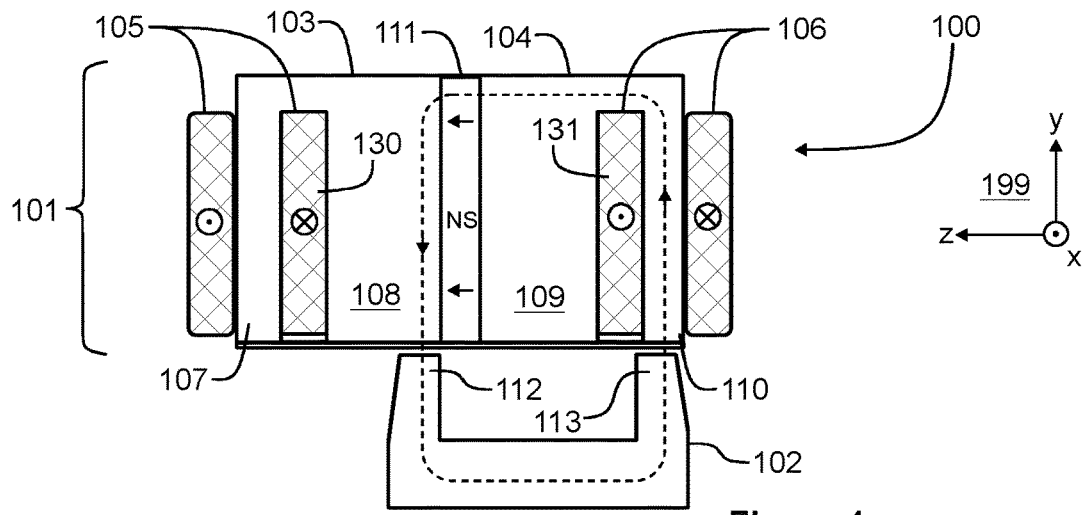

FIGS. 1a, 1b and 1c illustrate a magnetic actuator 100 according to an exemplifying and non-limiting embodiment. The magnetic actuator 100 comprises a first element 101 and a second element 102 that is movable with respect to the first element in a movement direction. In FIGS. 1a-1c, the movement direction of the second element 102 is parallel with the z-axis of a coordinate system 199. The first element 101 comprises a first core section 103 that comprises first and second teeth 107 and 108 and a first yoke connected to the first and second teeth. The first and second teeth 107 and 108 are successively in the movement direction of the second element 102 and protrude towards the second element 102. The first element 101 comprises a first coil 105 having a coil side 130 between the first and second teeth 107 and 108. The coil side 130 is suitable for carrying electric current perpendicularly to the movement direction of the second element 102. The coil 105 is depicted as a section view where the geometric section plane is parallel with the yz-plane of the coordinate system 199. The first element 101 comprises a second core section 104 that comprises third and fourth teeth 109 and 110 and a second yoke connected to the third and fourth teeth. The third and fourth teeth 109 and 110 are successively in the movement direction of the second element 102 and protrude towards the second element 102. The first element 101 comprises a second coil 106 having a coil side 131 that is between the third and fourth teeth 109 and 110 and is suitable for carrying electric current perpendicularly to the movement direction of the second element 102. The coil 106 is depicted as a section view where the geometric section plane is parallel with the yz-plane of the coordinate system 199. The first element 101 comprises a permanent magnet 111 between the first and second core sections 103 and 104 so that the first and second core sections are successively in the movement direction and the permanent magnet 111 is adjacent to the second and third teeth 108 and 109. A direction of magnetization of the permanent magnet 111 is non-intersecting, i.e. parallel, with the movement direction of the second element 102. In FIGS. 1a-1c, the direction of magnetization is depicted with arrows shown on top of the permanent magnet 111. The material of the permanent magnet 111 can be for example Neodymium-iron-boron "NIB", samarium-cobalt "SmCo", or some other suitable permanent magnet material.

The second element 102 of the magnetic actuator 100 comprises fifth and sixth teeth 112 and 113 and a yoke connected to the fifth and sixth teeth. The fifth and sixth teeth 112 and 113 are successively in the movement direction of the second element 102 and protrude towards the first element 101. In the exemplifying magnetic actuator illustrated in FIGS. 1a-1c, the tooth 108 of the first element 101 is wider in the movement direction of the second element 102 than the tooth 112 of the second element 102. Correspondingly, the tooth 109 of the first element 101 is wider in the movement direction of the second element 102 than the tooth 113 of the second element 102. The width of the tooth 108 can be for example at least 1.5 times the width of the tooth 112, and the width of the tooth 109 can be for example at least 1.5 times the width of the tooth 113. The second element 102 and the core sections 103 and 104 of the first element 101 comprise one or more materials whose relative magnetic permeability is greater than one, $\mu_r > 1$. The second element 102 and the core sections 103 and 104 of the first element 101 comprise advantageously ferromagnetic material. The second element 102 and/or the core sections 103 and 104 of the first element 101 can be made of for example solid ferromagnetic steel. For another example, the second element 102 and/or the core sections 103 and 104 may comprise ferromagnetic steel sheets stacked on each other so that there is electrically insulating material between the ferromagnetic steel sheets. The ferromagnetic steel sheets can be e.g. planar and parallel with the yz-plane of the coordinate system 199. It is also possible that the second element 102 and/or the core sections 103 and 104 comprise/comprises ferrite or soft magnetic composite "SMC" e.g. Somaloy®.

FIG. 1a shows an exemplifying situation in which the second element 102 is in a first position with respect to the first element 101. In this exemplifying situation, the teeth 112 and 113 of the second element 102 are aligned with the teeth 107 and 109 of the first element 101. In this exemplifying situation, the coil side 130 carries electric current in the positive x-direction of the coordinate system 199 and the coil side 131 carries electric current in the negative x-direction of the coordinate system 199. An exemplifying magnetic flux line is depicted with a dashed line loop provided with arrow heads. As the teeth 112 and 113 of the second element 102 are aligned with the teeth 107 and 109 of the first element 101, the magnetic flux generated by the permanent magnet 111 holds the second element 102 in the first position in a stable way also when there are no electric currents in the first and second coils 105 and 106. FIG. 1b shows an exemplifying situation in which the second element 102 is in a second position with respect to the first element 101. In this exemplifying situation, the teeth 112 and 113 of the second element 102 are aligned with the teeth 108 and 109 of the first element 101. A transition from the first position shown in FIG. 1a to the second position shown in FIG. 1b can be achieved for example so that the coil sides 130 and 131 are controlled to carry electric currents in the negative x-direction of the coordinate system 199. As the teeth 112 and 113 of the second element 102 are aligned with the teeth 108 and 109 of the first element 101, the magnetic flux generated by the permanent magnet 111 holds the second element 102 in the second position in a stable way also when there are no electric currents in the first and second coils 105 and 106. FIG. 1c shows an exemplifying situation in which the second element 102 is in a third position with respect to the first element 101. In this exemplifying situation, the teeth 112 and 113 of the second element 102 are aligned with the teeth 108 and 110 of the first element 101. A transition from the second position shown in FIG. 1b to the third position shown in FIG. 1c can be achieved for example so that the coil side 131 is controlled to carry electric current in the positive x-direction of the coordinate system 199 and the coil side 130 is controlled to carry electric current in the negative x-direction of the coordinate system 199. As the teeth 112 and 113 of the second element 102 are aligned with the teeth 108 and 110 of the first element 101, the magnetic flux generated by the permanent magnet 111 holds the second element 102 in the third position in a stable way also when there are no electric currents in the first and second coils 105 and 106.

In the exemplifying magnetic actuator 100 illustrated in FIGS. 1a-1c, there is an attractive magnetic force between the first and second elements 101 and 102. Whether this attractive magnetic force is acceptable depends on a device or a system in which the magnetic actuator is being used. In conjunction with some devices and systems, it is possible to use two magnetic actuators so that the attractive magnetic forces cancel each other at least partly.

In the exemplifying magnetic actuator 100 illustrated in FIGS. 1a-1c, the coil 105 is arranged to surround the tooth 107 and the coil 106 is arranged to surround the tooth 110. The coils can be however arranged in many ways. For example, the coil 105 can be arranged to surround the yoke of the first core section 103 and the coil 106 can be arranged to surround the yoke of the second core section 104 so that there are coil sides above the first and second core sections 103 and 104.

Figure 2:
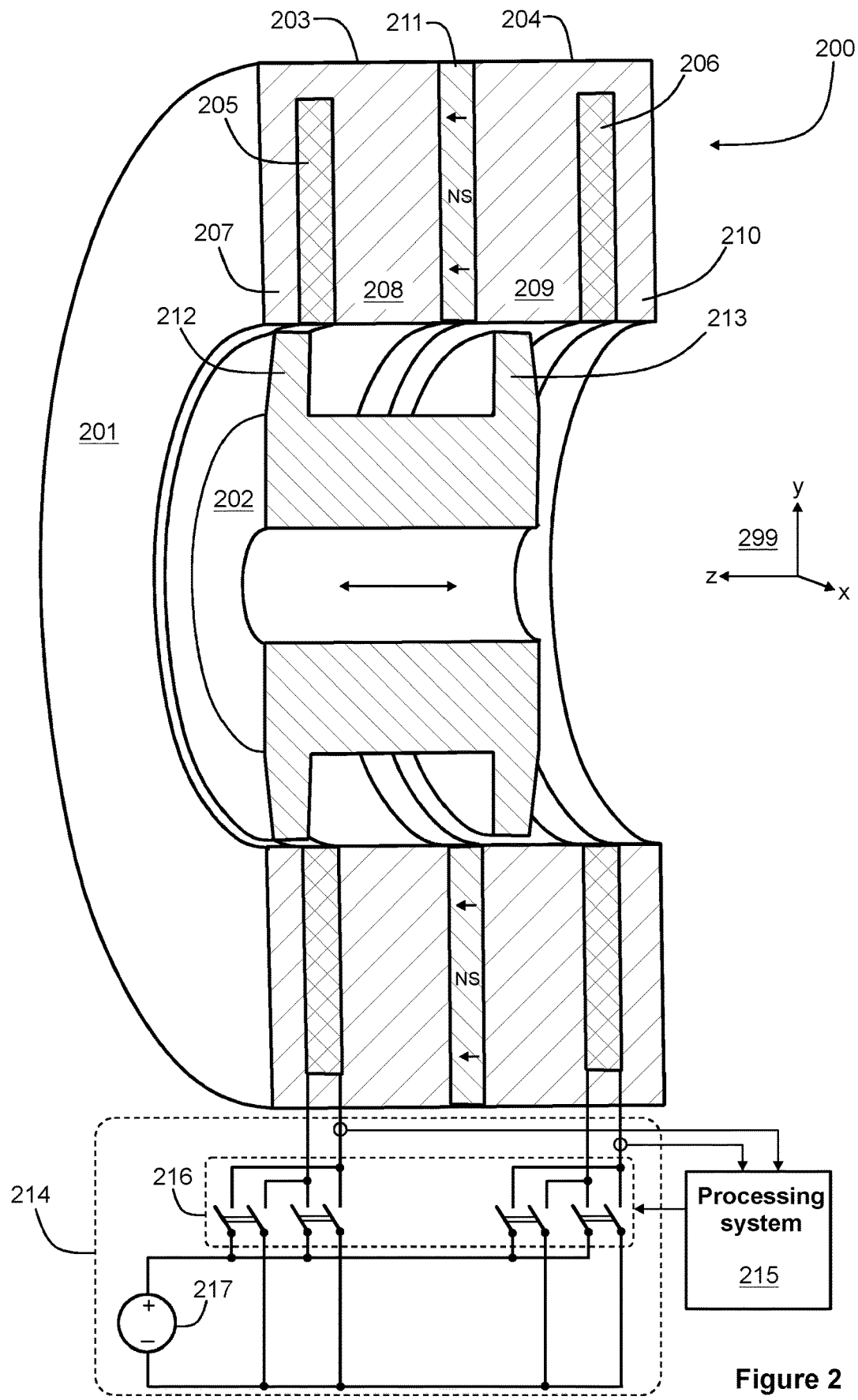
FIG. 2 illustrates a magnetic actuator according to another exemplifying and non-limiting embodiment.

FIG. 2 shows a section view of a magnetic actuator 200 according to an exemplifying and non-limiting embodiment. The geometric section plane is parallel with the yz-plane of a coordinate system 299. In this exemplifying case, the magnetic actuator 200 is tubular. The magnetic actuator 200 comprises a first element 201 and a second element 202 that is movable with respect to the first element in a movement direction. In FIG. 2, the movement direction of the second element 202 is parallel with the z-axis of the coordinate system 299. The first element 201 comprises a first core section 203 that comprises first and second teeth 207 and 208 and a first yoke connected to the first and second teeth. The first and second teeth 207 and 208 are successively in the movement direction of the second element 202 and protrude towards the second element 202. The first element 201 comprises a first coil 205 that is between the first and second teeth 207 and 208 and is suitable for carrying electric current perpendicularly to the movement direction of the second element 202. The first element 201 comprises a second core section 204 that comprises third and fourth teeth 209 and 210 and a second yoke connected to the third and fourth teeth. The third and fourth teeth 209 and 210 are successively in the movement direction of the second element 202 and protrude towards the second element 202. The first element 201 comprises a second coil 206 that is between the third and fourth teeth 209 and 210 and is suitable for carrying electric current perpendicularly to the movement direction of the second element 202. The first element 201 comprises a permanent magnet 211 between the first and second core sections 203 and 204 so that the first and second core sections are successively in the movement direction of the second element 202 and the permanent magnet 211 is adjacent to the second and third teeth 208 and 209. A direction of magnetization of the permanent magnet 211 is non-intersecting, i.e. parallel, with the movement direction of the second element 202. In FIG. 2, the direction of magnetization is depicted with arrows shown on section views of the permanent magnet 211. The second element 202 and the core sections 203 and 204 of the first element 201 comprise one or more materials whose relative magnetic permeability is greater than one, $\mu_r > 1$.

In the exemplifying magnetic actuator illustrated in FIG. 2, the first element 201 comprises an aperture so that the first and second coils 205 and 206 are suitable for carrying electric currents circulating the aperture and the second element 202 is movable in the aperture of the first element 201. In this exemplifying case, the first and second elements 201 and 202 are rotationally symmetric with respect to a geometric line parallel with the movement direction of the second element i.e. parallel with the z-axis of the coordinate system 299. In a magnetic actuator according to another exemplifying and non-limiting embodiment, the aperture of the first element and correspondingly the outline of the second element have non-circular shapes when seen along the movement direction of the second element. The non-circular shape can be e.g. a square or another polygon, or an oval shape. The rotationally symmetric magnetic actuator 200 illustrated in FIG. 2 is suitable for applications where the second element 202 rotates with respect to the first element 201.

The magnetic actuator 200 comprises a controllable electric system 214 for supplying first electric current to the first coil 205 and second electric current to the second coil 206. In this exemplifying case, the controllable electric system 214 comprises a direct voltage source 217 and a switch system 216 for directing currents to the first and second coils 205 and 206 so that directions of the currents are controllable.

A magnetic actuator according to an exemplifying and non-limiting embodiment comprises a processing system 215 for controlling the controllable electric system 214 to supply an electric measurement signal to the first and second coils 205 and 206 and for detecting a position of the second element 202 with respect to the first element 201 based on a difference of electric response signals of the first and second coils. The electric response signals are dependent on impedances of the coils 205 and 206, and thereby the difference of electric response signals is dependent on a difference of the impedances. The impedances are substantially same when the second element 202 is located symmetrically with respect to the coils 205 and 206. The impedances differ from each other when the second element 202 is located asymmetrically with respect to the coils 205 and 206 e.g. in the way shown in FIG. 2. The impedances are substantially inductive when the second element 202 and the core sections 203 and 204 of the first element 201 are made of material having low electrical conductivity, whereas the impedances have more significant resistive components when the second element 202 and the core sections 203 and 204 of the first element 201 are made of e.g. solid steel. However, in both cases, the impedances are dependent on the position of the second element 202.

In a magnetic actuator according to an exemplifying and non-limiting embodiment, the processing system 215 is configured to control the controllable electric system 214 to supply direct voltage to the coils 205 and 206 and to determine the position of the second element 202 with respect to the first element 201 based on rates of changes of the electric currents of the coils 205 and 206. A magnetic actuator according to another exemplifying and non-limiting embodiment comprises means for supplying an alternating electric signal, current or voltage, to the coils and means for determining the position of the second element based on a difference between alternating response signals of the coils.

The processing system 215 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the processing system 215 may comprise one or more memory circuits, each of which can be e.g. a random-access memory "RAM" circuit.

Figure 3:
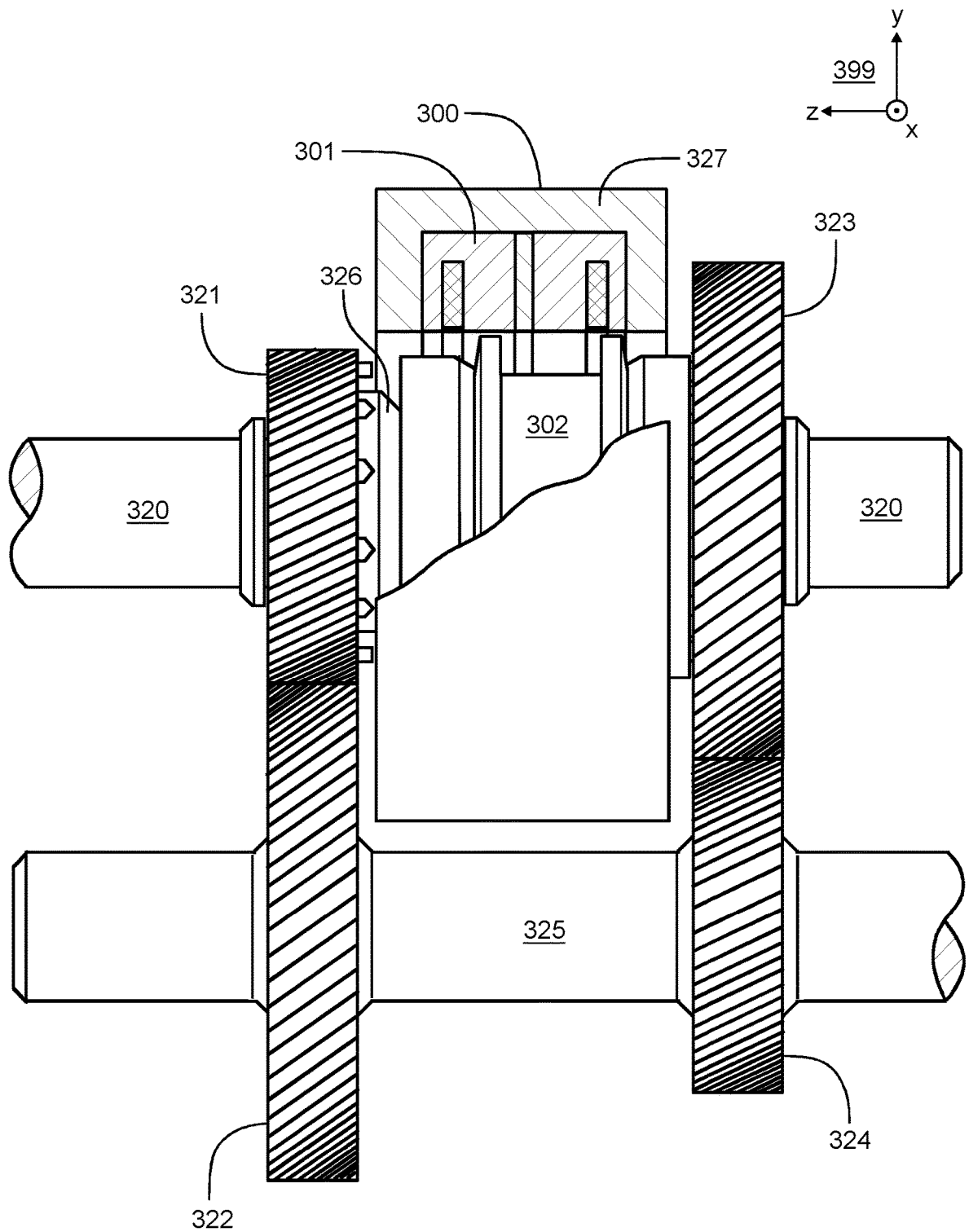
FIG. 3 illustrates a gear system according to an exemplifying and non-limiting embodiment.

FIG. 3 illustrates a gear system according to an exemplifying and non-limiting embodiment. The gear system comprises a gear-wheel assembly capable of producing different selectable gear ratios. The gear system comprises a magnetic actuator 300 according to an exemplifying and non-limiting embodiment for controlling the gear-wheel assembly to produce a desired one of the selectable gear ratios. The magnetic actuator 300 is presented as a partial section view. In this exemplifying case, the gear-wheel assembly comprises a first shaft 320 provided with first gear wheels 321 and 323 and a second shaft 325 provided with second gear wheels 322 and 324. Each of the second gear wheels 322 and 324 is capable of transferring torque to and from the second shaft 325 and meshes with a corresponding one of the first gear wheels 321 and 323. The magnetic actuator 300 is suitable for determining which one of the first gear wheels 321 and 323 is capable of transferring torque to and from the first shaft 320. Furthermore, the magnetic actuator 300 is suitable for setting the gear system to a neutral position in which neither one of the first gear wheels 321 and 323 is capable of transferring torque to and from the first shaft 320.

The magnetic actuator 300 comprises a first element 301 and a second element 302. The second element 302 is capable of transferring torque to and from the first shaft 320 and sliding in the axial direction along the first shaft 320. The axial direction is parallel with the z-axis of a coordinate system 399. The second element 302 comprises indentations for locking in a torque transferring way to corresponding indentations of the gear wheel 321 when the second element 302 is in its leftmost position and for locking in a torque transferring way to corresponding indentations of the gear wheel 323 when the second element 302 is in its rightmost position. Both the first gear wheels 321 and 323 can rotate freely with respect to the first shaft 320 when the second element 302 is in a middle position. FIG. 3 shows an exemplifying situation where the second element 302 is in its rightmost position and thus a mechanical power transfer path is formed through the gear wheels 323 and 324. In the exemplifying gear system illustrated in FIG. 3, there are two selectable gear ratios. In a gear system according to another exemplifying and non-limiting embodiment, there are more than two selectable gear ratios and two or more magnetic actuators of the kind described above. Furthermore, magnetic actuators according to exemplifying and non-limiting embodiments can be used in different types of gear systems such as e.g. planetary gear systems. Furthermore, magnetic actuators according to exemplifying and non-limiting embodiments can be used also in devices and systems other than gear systems.

The magnetic actuator 300 may further comprise synchronizing means for synchronizing the rotation speeds of the second element 302 and the gear wheel 321 or 323 prior to forming the torque transferring coupling between the second element 302 and the gear wheel under consideration. The synchronizing means may comprise for example elements having conical surfaces for contacting with corresponding conical surfaces attached to the gear wheels 321 and 323 prior to forming the above-mentioned torque transferring coupling. In FIG. 3, the conical surface attached to the gear wheel 321 is denoted with a reference number 326. A support element 327 that surrounds the first element 301 of the magnetic actuator 300 is advantageously made of non-ferromagnetic material to reduce undesired leakage flux of the permanent magnet of the magnetic actuator 300.

The specific examples provided in the description given above should not be construed as limiting the scope and/or the applicability of the appended claims. Lists and groups of examples provided in the description given above are not exhaustive unless otherwise explicitly stated.

What is claimed is:

1. A magnetic actuator comprising a first element and a second element movable with respect to the first element in a movement direction of the second element, the first element comprising:
   a first core section comprising first and second teeth successively in the movement direction and protruding towards the second element and a first yoke connected to the first and second teeth,
   a first coil having a coil side between the first and second teeth and suitable for carrying electric current perpendicularly to the movement direction of the second element,
   a second core section comprising third and fourth teeth successively in the movement direction of the second element and protruding towards the second element and a second yoke connected to the third and fourth teeth,
   a second coil having a coil side between the third and fourth teeth and suitable for carrying electric current perpendicularly to the movement direction of the second element, and
   a permanent magnet between the first and second core sections so that the first and second core sections are successively in the movement direction of the second element and the permanent magnet is adjacent to the second and third teeth, the permanent magnet having a direction of magnetization non- intersecting with the movement direction of the second element, south and north poles of the permanent magnet being successively arranged with each other in the direction of magnetization,
   wherein each of the first core section, the second core section, and the second element comprises material having relative magnetic permeability greater than one, $\mu_r > 1$, and wherein the second element comprises fifth and sixth teeth successively in the movement direction of the second element and protruding towards the first element and a yoke connected to the fifth and sixth teeth, and wherein the fifth and sixth teeth are overlapping with the first and third teeth respectively when the second element is in a first position with respect to the first element, the fifth and sixth teeth are overlapping with the second and third teeth respectively when the second element is in a second position with respect to the first element, and the fifth and sixth teeth are overlapping with the second and fourth teeth respectively when the second element is in a third position with respect to the first element, and wherein each of the first core section, the second core section, and the second element comprises ferromagnetic material.

2. The magnetic actuator according to claim 1, wherein the first element comprises an aperture so that the first and second coils are suitable for carrying electric currents circulating the aperture and the second element is movable in the aperture of the first element.

3. The magnetic actuator according to claim 2, wherein the first and second elements are rotationally symmetric with respect to a geometric line parallel with the movement direction of the second element.

4. The magnetic actuator according to claim 3, wherein the magnetic actuator further comprises a controllable electric system for supplying first electric current to the first coil and second electric current to the second coil.

5. The magnetic actuator according to claim 2, wherein the magnetic actuator further comprises a controllable electric system for supplying first electric current to the first coil and second electric current to the second coil.

6. The magnetic actuator according to claim 1, wherein each of the first and second core sections comprises at least one of the following: solid steel, ferrite, soft magnetic composite, a stack of electrically insulated steel sheets.

7. The magnetic actuator according to claim 6, wherein the second element comprises at least one of the following: solid steel, ferrite, soft magnetic composite, a stack of electrically insulated steel sheets.

8. The magnetic actuator according to claim 6, wherein the magnetic actuator further comprises a controllable electric system for supplying first electric current to the first coil and second electric current to the second coil.

9. The magnetic actuator according to claim 1, wherein the second element comprises at least one of the following: solid steel, ferrite, soft magnetic composite, a stack of electrically insulated steel sheets.

10. The magnetic actuator according to claim 1, wherein the magnetic actuator further comprises a controllable electric system for supplying first electric current to the first coil and second electric current to the second coil.

11. The magnetic actuator according to claim 1, wherein the second tooth of the first element is wider in the movement direction of the second element than the fifth tooth of the second element, and the third tooth of the first element is wider in the movement direction of the second element than the sixth tooth of the second element.

12. A gear system comprising:
   a gear-wheel assembly capable of producing gear ratios that are different from each other, and
   at least one magnetic actuator capable of controlling the gear-wheel assembly to produce a selected one of the gear ratios,
   wherein the magnetic actuator comprises a first element and a second element movable with respect to the first element in a movement direction of the second element, the first element comprising:
   a first core section comprising first and second teeth successively in the movement direction of the second element and protruding towards the second element and a first yoke connected to the first and second teeth,
   a first coil having a coil side between the first and second teeth and suitable for carrying electric current perpendicularly to the movement direction of the second element,
   a second core section comprising third and fourth teeth successively in the movement direction of the second element and protruding towards the second element and a second yoke connected to the third and fourth teeth,
   a second coil having a coil side between the third and fourth teeth and suitable for carrying electric current perpendicularly to the movement direction of the second element, and
   a permanent magnet between the first and second core sections so that the first and second core sections are successively in the movement direction of the second element and the permanent magnet is adjacent to the second and third teeth, the permanent magnet having a direction of magnetization non-intersecting with the movement direction of the second element, south and north poles of the permanent magnet being successively arranged with each other in the direction of magnetization,
   wherein each of the first core section, the second core section, and the second element comprises material having relative magnetic permeability greater than one, $\mu_r > 1$, and wherein the second element comprises fifth and sixth teeth successively in the movement direction of the second element and protruding towards the first element and a yoke connected to the fifth and sixth teeth, and wherein the fifth and sixth teeth are overlapping with the first and third teeth respectively when the second element is in a first position with respect to the first element, the fifth and sixth teeth are overlapping with the second and third teeth respectively when the second element is in a second position with respect to the first element, and the fifth and sixth teeth are overlapping with the second and fourth teeth respectively when the second element is in a third position with respect to the first element.

13. The gear system according to claim 12, wherein the gear-wheel assembly comprises a first shaft provided with first gear wheels, a second shaft provided with second gear wheels each being capable of transferring torque to and from the second shaft and meshing with a corresponding one of the first gear wheels, and the at least one magnetic actuator is suitable for determining which one of the first gear wheels is capable of transferring torque to and from the first shaft.

\* \* \* \* \*